Nov. 28, 1950           J. T. KING           2,532,104
AIRCRAFT, STABILIZED AND POSITIONED, LIGHT
APPARATUS FOR AERIAL NAVIGATION
Filed April 2, 1945           4 Sheets-Sheet 1
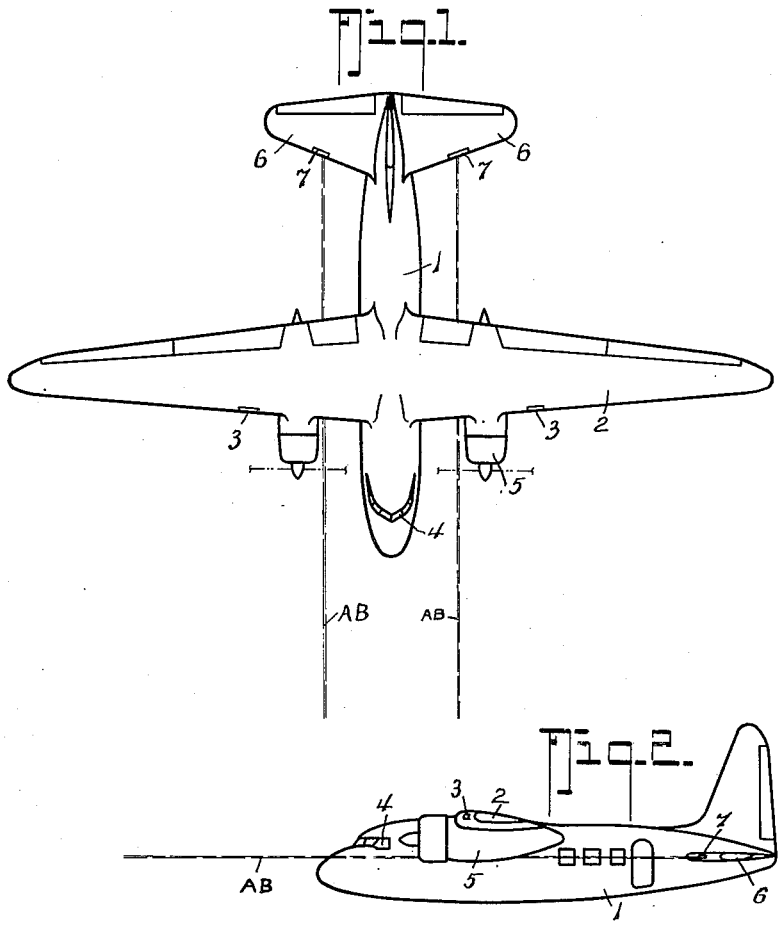
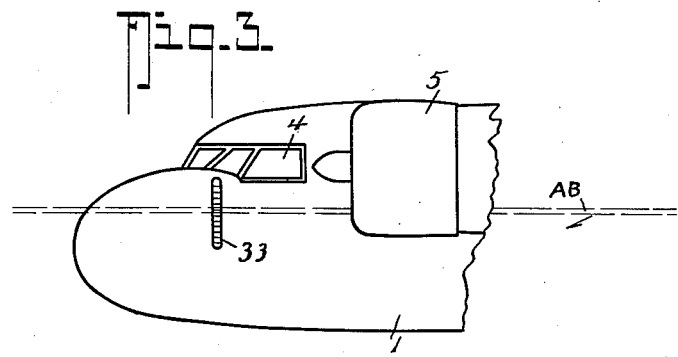
INVENTOR,
James T. King,
BY
Albert E. Dieterich,
ATTORNEY.

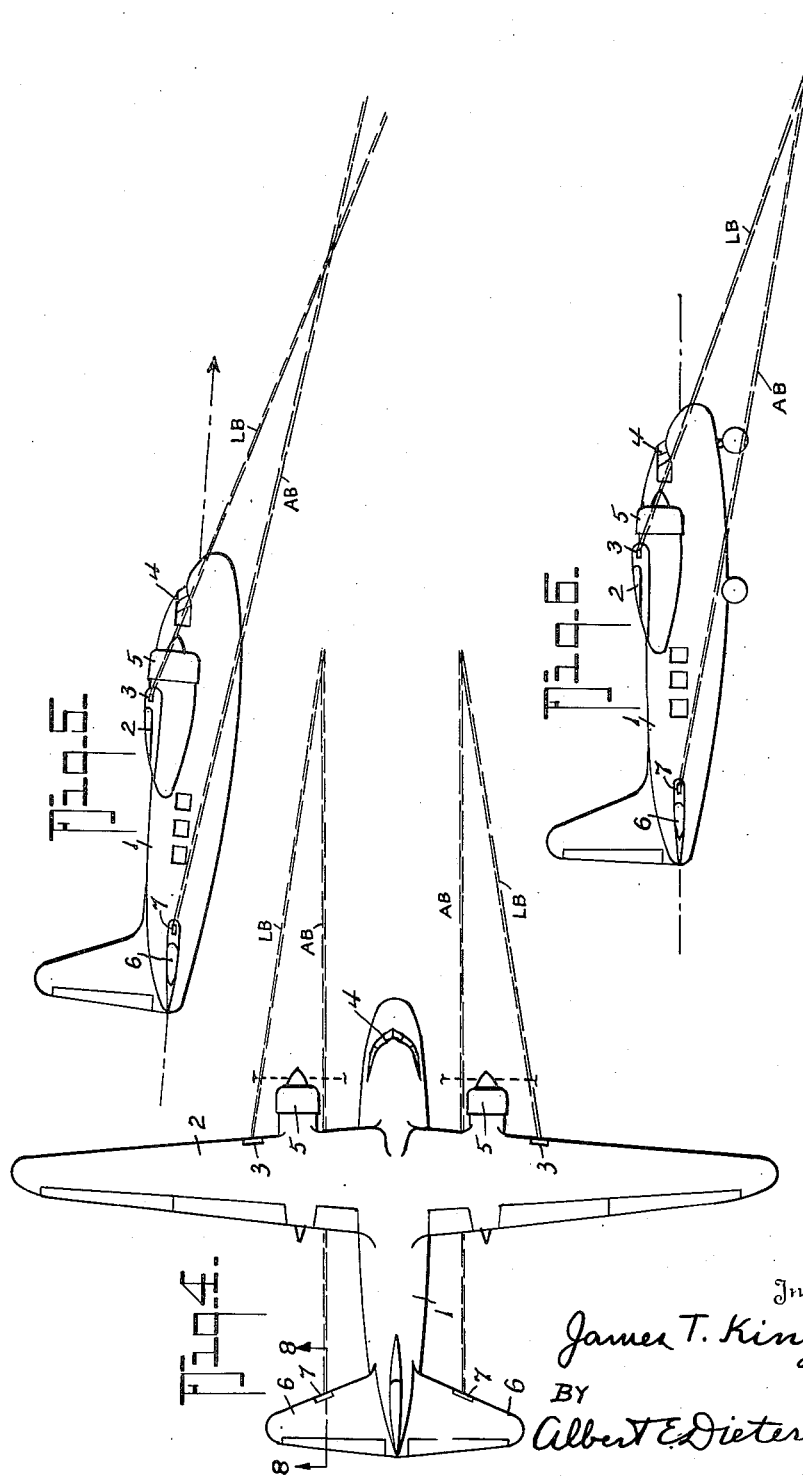

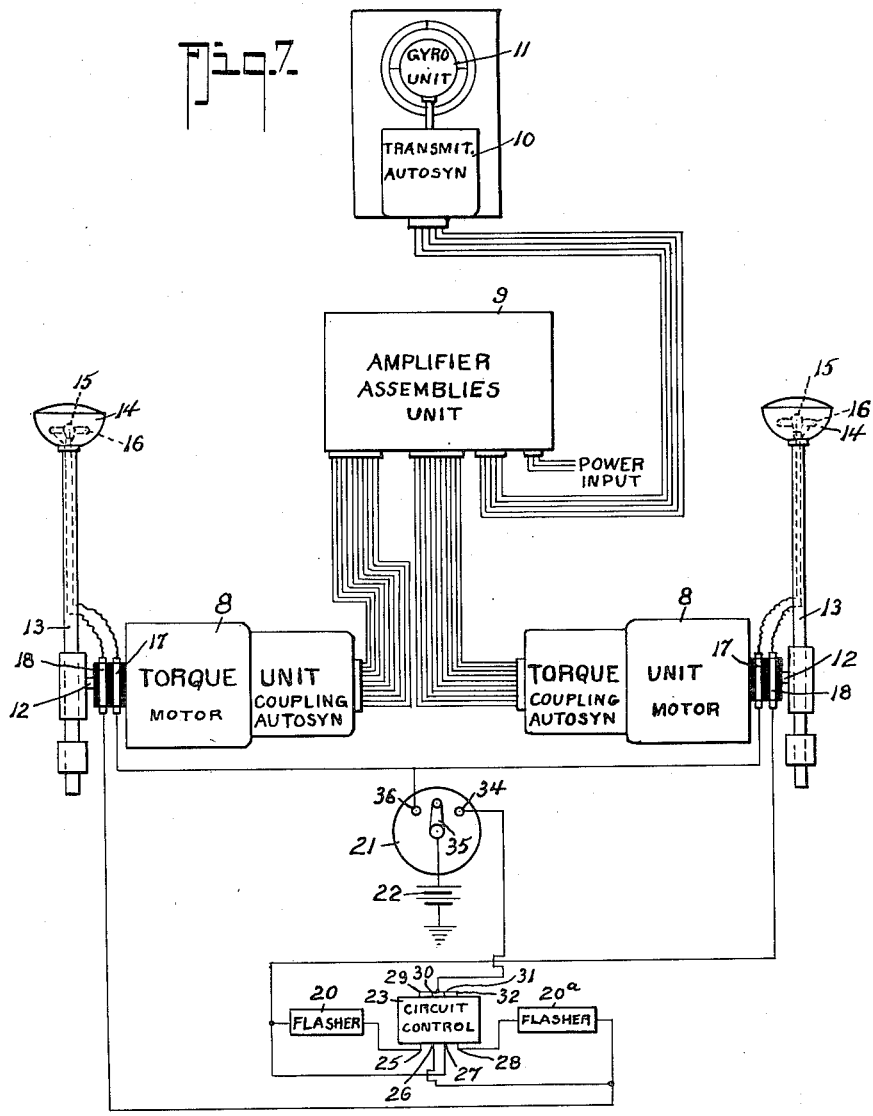

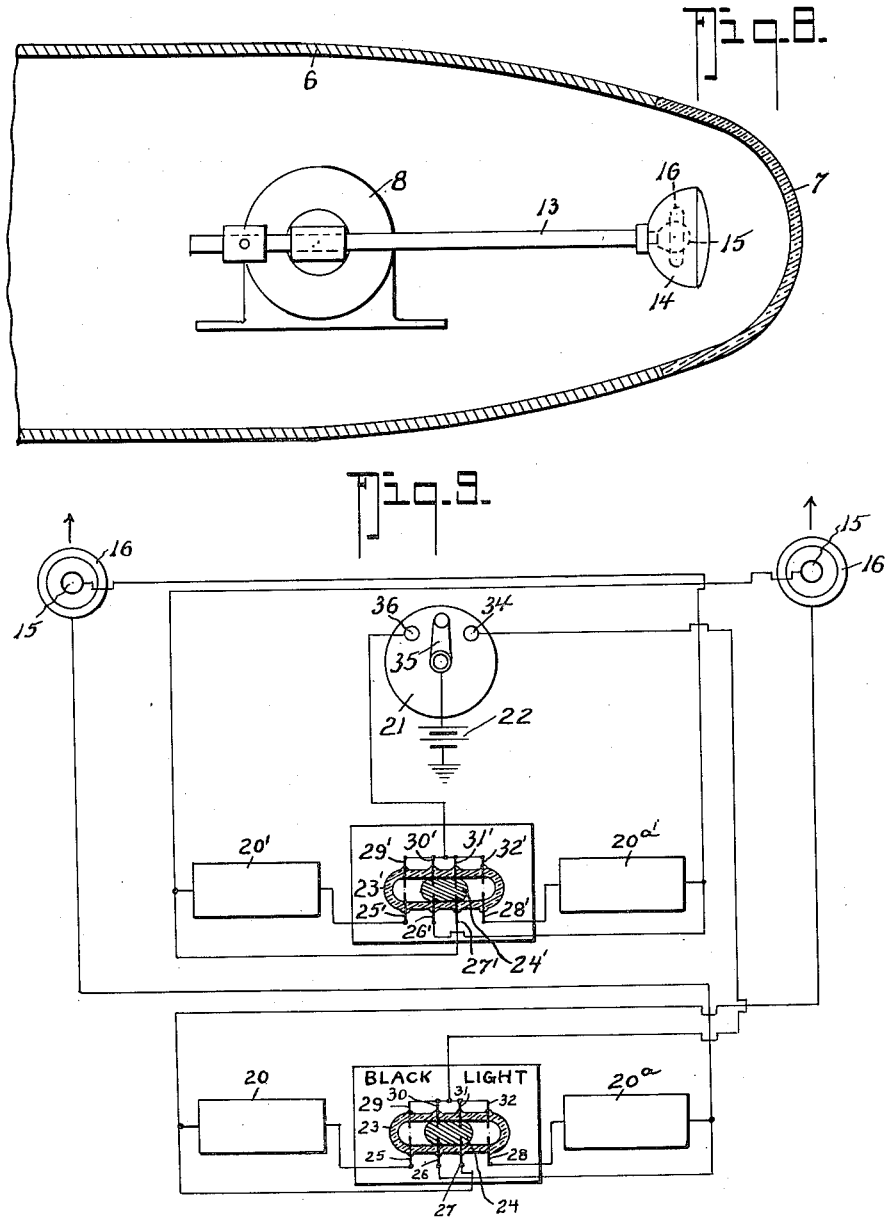

Patented Nov. 28, 1950

2,532,104

UNITED STATES PATENT OFFICE 2,532,104

AIRCRAFT, STABILIZED AND POSITIONED, LIGHT APPARATUS FOR AERIAL NAVIGATION

James Thomas King, Burbank, Calif.

Application April 2, 1945, Serial No. 586,046

8 Claims. (Cl. 33—46)

My invention, which relates to the art of aerial navigation, has for its objects:

1. In general, to provide and incorporate in the aircraft's navigating system, combinations for several important and useful applications and functions to aid aircraft flight procedures during periods of darkness, or when landings are anticipated on a permanent runway of an airport, or emergency forced landings on unlighted, unknown terrain may have to be made, or during night flights to and from the flight decks of aircraft carriers, or actual amphibious operations;

2. To incorporate with and combine in the aircraft's usual fixed lighting system additional safety features particularly designed for immediate operation when flight procedure must depend solely on instruments, with directional flight maintained from signals heard over the aircraft's radio system;

3. To provide two parallel, remotely controlled, gyroscopically positioned auxiliary light beams, the purpose of which is to furnish a visible simulated horizon;

4. To provide in each auxiliary light projector unit, means to furnish narrow illuminated light beams or black light beams and control the selection or the choice of either by means of an electrical control switch located in the cockpit within easy reach of the operator;

5. To provide means, in cooperation with said auxiliary light beams, for causing a blinking of the beam on the high side during steep banks, or when the craft is tilted laterally to a substantial degree;

6. To provide fixed, graduated indicator tubes at either side of the fuselage or body of the plane in front of the operator, which tubes will glow under the influence of the black light beams and indicate any departure from level flight;

7. To provide for holding the auxiliary flight beams parallel and at a fixed angle with respect to the normal landing light beams during landing and take-off operations;

8. To locate auxiliary light beam projectors within or on the horizontal stabilizers of the aircraft so that the beams of light will pass beneath the wings of the craft and thus eliminate the effect of side glare on the operator.

Other objects will in part be obvious and in part be pointed out hereinafter.

To the attainment of the aforesaid objects and ends, the invention further resides in those novel details of construction, combination and arrangement of parts, all of which will be first described in detail hereinafter, and will then be specifically pointed out in the appended claims, reference being had to the accompanying drawings, in which:

Fig. 1 is a top plan view of an airplane showing the auxiliary light beams in broken lines, the airplane's landing lights being turned off.

Fig. 2 is a side elevation of the same with the airplane in normal level flight.

Fig. 3 is an enlarged side-elevational detail view of the front section of the aircraft and pilot enclosure showing the location of the left side luminous indicating plastic tube.

Fig. 4 is a top plan view of an aircraft showing the location and extent of the parallel auxiliary light beams and, in addition, the two converging fixed light beams.

Fig. 5 is a side-elevational view of the aircraft showing the same in normal gliding angle for a landing, and showing the location and intersection of the predetermined and positioned light beams.

Fig. 6 is a similar view showing level flight attitude preliminary to landing-wheel contact with the ground, and the changed status of the intersecting angles of the positioning light beams.

Fig. 7 is a schematic top plan view of typical torque units with assembled light beam projectors, an amplifier assembly, a transmission autosyn, and a prime mover.

Fig. 8 is an enlarged detail sectional view on line 8—8 of Fig. 4.

Fig. 9 is a detail diagrammatic view of a means for causing the high-side auxiliary light beam to flash when the craft is tilted laterally or blanked.

In the drawings, in which like numerals and letters of reference indicate like parts in all the figures, 1 represents the body or fuselage of an aircraft having wings 2 in which the fixed landing lights, now in use, are located and, through conventional windows 3 in the leading edges of the wings, the conventional landing light beams LB project when turned on. The operator's cabin is indicated by 4, the motors by 5 and the horizontal stabilizers by 6.

In each horizontal stabilizer 6 is mounted a torque unit 8. Each torque unit may consist of a coupling autosyn and a low-inertia motor cooperatively connected with the coupling autosyn. The motor shaft of each torque unit is indicated by 12 and carries current conducting rings 17 and 18 and a light carrying arm 13. The arms 13 carry reflectors 14 in which the visual light bulbs 15 and the black light tubes 16 are located. Contact rings 17 and 18 (Fig. 7), mounted on the shaft 12, are suitably connected electrically to the light bulbs 15 and to the tubes 16. The horizontal stabilizers are provided with transparencies or windows 7 through which the light beams are projected forwardly. The axes of the right and left torque units lie in alignment and normal to the central vertical longitudinal plane of the aircraft, so as to project the auxiliary beams AB parallel, in planes normal to the axes of the torque units at all times.

A transmitting autosyn 10 is provided, which effects operation of the torque units via an amplifier assembly 9 with which it and the torque units are suitably operatively connected, as diagrammatically indicated in Fig. 7. The transmitter autosyn is controlled by a prime mover, which may be a motor-driven gyro with automatic and manual caging devices. The prime mover is diagrammatically indicated at 11 in Fig. 7.

Any suitable means may be provided for causing the auxiliary light on the high side of a laterally tilting or banking plane to flash at intervals. For convenience of illustration only, I have diagrammatically illustrated one way of accomplishing this act. By reference to Fig. 9 it will be seen that a gravity actuated circuit switch 23 is provided. This switch may be a glass tube containing a drop of mercury 24. There are provided four contacts 25, 26, 27 and 28 on the low side of the tube, and corresponding contacts 29, 30, 31 and 32 on the top side of the tube. The contacts 29 to 32 inclusive are electrically connected together. Contact 25 is connected to a flasher 20 which is, in turn, connected to the tube 16 of the right side auxiliary black light beam. The contact 27 is directly connected to that same tube 16. Contact 28 is connected to a flasher 20a which is, in turn, connected to the tube 16 of the left side auxiliary black light beam. The contact 26 is directly connected to the same tube 16.

When the plane is in level flight transversely the mercury will close the circuit between the common set of contacts 29 to 32 inclusive and the two contacts 26 and 27. Thus both the right and left auxiliary black light tubes 16 will be energized. Should, however, the craft go into a bank, or tilt laterally, the circuits will undergo a change. For example, if the left wing becomes higher, drop 24 will leave contact 26 and engage contact 28, thus passing the current for the left-side auxiliary light through the flasher 20a, while maintaining engagement with contact 27 that bypasses flasher 20 so only the high-side light will flash until the plane is leveled again.

For cooperation with the black light beams, to give visual indication to the operator, I provide at each side of the operator's cabin 4 a fixed vertical tube 33 containing material which will fluoresce or glow at the point where the beam strikes the tube 33. By providing the tubes 33 with suitable graduation marks, the degree of variation in a vertical direction from level flight can be determined visually by the operator of the plane.

The common contacts 29 to 32 inclusive may be connected electrically to one terminal 34 of a switch 21, the movable arm 35 of which is electrically connected to a source of energy 22. One terminal of each light bulb 15 and one terminal of each black light tube 16, and one terminal of the source of energy 22 are grounded together. The other fixed terminal 36 of the switch 21 may be directly electrically connected to both light bulbs 15 or a flasher arrangement duplicating that for the black light may be provided, if desired, for effecting the flashing of the high-side visual light beam. (See Figs. 9, 20' to 32' inclusive.)

As previously intimated, it will be clearly understood, by those skilled in the art of aerial navigation, that the present invention is not designed to replace an aircraft's flight instruments or the aircraft's permanent fixed landing lights, but to supplement them.

The various applications that can be made with this invention give many advantages at those periods of flight just previous to being airborne, or landing-wheel contact with the ground. The application of the invention for mechanically providing right and left simulated horizons will be clearly indicated when the need is found for auxiliary assistance when necessary for reasons of safety to the craft and the personnel.

It is conceded that flight of an aircraft is possible only when sustaining airspeed is reached and maintained. Before flight is possible progressive steps must be completed before the aircraft is airborne; a reversed procedure is necessary to terminate the flight for the landing. With the aircraft's airspeed indicators reading in miles per hour, and altimeters recording scaled distances in feet from sea level, it can be seen that positive, accurate and immediate readings are not possible, by reason of the requirement of the aircraft's motivation which is necessary in order to obtain and record the readings.

The following is a summary of the possible uses of the invention:

A. One application of the invention deals with an aircraft in flight and the need to create simulated horizons. In this application of the invention the torque units and light beam reflectors are remotely controlled by the autosyn transmitter connected to a gyro, which maintains the light beams for a constant stabilized positioning for horizontal and level projection at all times, regardless of the aircraft's flight attitude. Selection can be made at any time for incandescent light illumination or the ultra-violet (black) light ray projection. When the ultra-violet light source is used, the rear-mounted and positioned units project their beams forward onto the glow tubes 33, causing them to glow as before described. In this way the pilot, by the visual indication shown, maintains the aircraft in level or normal flight in such a way that the indexing tubes (glow tubes 33) will be in the constant path of the ultra-violet light rays at all times. By the use of this method the operator need not be continuously referring to the instrument panel, as is now the practice when the flight calls for planned instrument flying.

If the selection or application of the invention is made for the creation of simulated horizons by means of the incandescent light-beam source, the same procedure goes forward, with the exception that the reference and indicating light beams will be projected some distance away from the pilot's enclosure and extend forward, substantially as shown in Figs. 1 and 2.

B. Another application of the invention deals with the increase in safety factors for aircraft landings, whether scheduled or forced or emergency. This functional use of the invention, as will be clear by reference to Figs. 4, 5 and 6, will correct many of the problems concerned with forward and downward depth perception by dimensioning visually, distance and timing for ground contact. The visible concept in landings gives advantages over all other known methods to assist a pilot, including other devices which depend on the exclusive use of beamed radio signals. Since the torque units are so constructed that their rotating shafts maintain, at all times, the exact relative position of the shaft of the autosyn transmitter which is mounted on the instrument panel of the aircraft, the pilot may position these lights relative to the aircraft's longitudinal center line of flight, merely by adjusting and rotating the shaft of the autosyn transmitter the desired number of degrees and the torque units will automatically follow in step.

In addition to the rear light beams which are capable of being positioned, there are the two others which are fixed and mounted in the leading edges of the aircraft's wings. These fixed lights are fixed so as to project their beams at a predetermined angle to the aircraft's center line of flight in a downward and converging direction, as shown in Figs. 4, 5 and 6. A pilot, therefore, knowing the predetermined and fixed angles of the fixed, forwardly projecting, converging lights, and having specifically set the rear (auxiliary) mounted light beams at a definite and prescribed angle for position, flies the craft in normal angle of flight. When the two light ray beams at the respective sides of the craft intersect on the ground, he is given the information visually of the distance from the ground and can then settle the craft for wheel-contact with the ground. It will be apparent that by this means of visual, dimensioned assistance the pilot will not be continuously looking back and forth at the instrument panel and the ground, which is required for instrument approaches and landings. In this particular functional use the gyro is not essential to position the rear mounted light beams as a predetermined stationary downward projection of the rear light beams may be made by adjusting the setting of the autosyn transmitter manually.

It should be particularly noted that after the projection and intersection of both the fixed and the positioned light beams have been made, they will stay equal-distanced for length to the final point of convergence with no change to the visible triangulation. This will be in effect, regardless of any rapid or unexpected change of the aircraft's directional position. It will be apparent also to those skilled in the art that the application of the invention to amphibious operations will considerably reduce the existing hazards when landings are being attempted on rough and open waters under conditions of darkness. It is possible, by the use of my invention, to calculate by visual observation the actual distance of the aircraft from the water's surface. With the assistance given by the projected light beams and planned intersection, it will be possible to delay the actual contact with the water surface so as to by-pass the high peaks of wave-crests, to later be safely water-borne in the trough following a preceding wave.

C. The invention may also be used materially to assist flight operations now concerned with airmail "pick-up" service. The pilot will first put the aircraft in a normal approach and gliding angle and then position the rear mounted light beams so as to index on the two posts holding the rope and hooking device. It will be obvious that when the positioned light beams actually spot light on the posts of the "pick-up" service, a slight descent of the craft will further insure a more precise, accurate and safer "pick-up."

D. The invention further provides an available and practical aid to aircraft when operated from the flight decks of aircraft carriers. The advantages gained in having readily available a light beam which accurately indexes the exact position of a stationary aircraft, previous to being airborne, in relation to that portion of the flight area which is considered safe, will be obvious to those familiar and experienced with aircraft carriers and flight operation. With the rear light beams originating from a fixed position on the aircraft and extending forward along the flight deck, any sudden deviation from a straight line in the deck-run would be immediately indicated by movement of the light beams at the planned points of actual departure from the flight deck.

With darkness landings scheduled on the flight decks of aircraft carriers, material assistance will be given to both the pilot and the officer charged with the responsibility for landing or dispatching the aircraft. The positioned light beams will serve to advantage to indicate a low or high wind approach, with the opportunity to make a last-second correction and thus eliminate a possible "wave-off" signal and the attendant risk involved in a second attempt.

With the needs of military operations and "black-out" landings in effect, the ultra-violet light beam selection could be substituted, and the fluorescing features activated on two suitable plastic markers located on the immediate entrance area of the landing flight deck.

E. In mass flight movements of large numbers of aircraft proceeding in darkness, it would be necessary only to have selected aircraft with positioned light beams. It will be obvious that a greater feeling of security will be experienced in close formation flight if the leaders of each group could be made visible by positioned light beams.

The several units of apparatus employed in my invention can be purchased in the open market and, per se, are not of my invention. For the torque units, the amplifier units, the transmitter autosyn, see "Pioneer Remote Torque-control Systems," copyright 1944 by Bendix Aviation Corporation of Teterboro, New Jersey. The gyro and dial-adjusting indicators can be purchased from the Sperry Gyroscope Company, Inc., Brooklyn, New York, or the General Electric Company, a corporation of New York.

The present aplication is a continuation in part of my application filed February 12, 1944, Serial No. 522,177 and later abandoned.

From the foregoing description, taken in connection with the accompanying drawings, it is thought that the construction, operation and advantages of the invention will be clear to those skilled in the art to which it appertains.

What I claim is:

1. In an aircraft having wings and horizontal stabilizers located to the rear of the wings; means for projecting parallel light beams forwardly of the craft from the leading edges of said stabilizers, aviator-controlled, autosyn operated, means for moving said first mentioned means about an axis transverse to the longitudinal axis of the aircraft, in combination with means for projecting conventional landing light beams convergingly from the wings of the plane.

2. In an aircraft having wings and horizontal stabilizers located to the rear of the wings; means for projecting parallel light beams forwardly of the craft from the leading edges of said stabilizers, two glow-tubes, one at each side of the pilot's compartment of the plane, on which tubes the respective light beams from the horizontal stabilizers are focused; and means for maintaining said light beams projected horizontally, said light beams comprising black light.

3. In an airplane having wings and horizontal stabilizers located to the rear of the wings and conventional landing light beam projectors in the wings; means for projecting parallel light beams forwardly of the craft from the leading edges of said stabilizers, means to mount said means for projecting to turn about a common axis transverse of the airplane, a motor for each of said means for projecting, a coupling autosyn for each motor, a transmitter autosyn operatively coupled with said coupling autosyns, and means to operate said transmitter autosyn by virtue of all of which the light beams from the stabilizers may be caused to intersect the landing light beams at predetermined distances from the wings and stabilizers respectively, for landing and take-off purposes.

4. In an aircraft having wings and horizontal stabilizers located to the rear of the wings; means for projecting parallel light beams forwardly of the craft from the leading edges of said stabilizers and means for maintaining asid light beams horizontal, said last named means including a gyro prime mover, an autosyn transmitter with which the prime mover is operatively connected, an amplifier unit with which said autosyn transmitter is operatively connected, a torque unit for each light beam projecting means, which torque units are operatively connected with said amplifier unit.

5. In an aircraft having wings and horizontal stabilizers located to the rear of the wings, one on each side of the fuselage; means for projecting parallel black-light beams forwardly of the craft from the leading edges of said stabilizers; two glow-tubes, one located at each side of the pilot's compartment within the path of the light beam at the respective side of the aircraft, means cooperative with the beam projecting means for maintaining said light beams horizontal, and means for blinking the light beam on the high side of the craft when the craft banks or tilts.

6. In an aircraft having wings and rear horizontal stabilizers: the combination with the stabilizers, of gyroscope-controlled light-beam-projectors located in the stabilizers adjacent the front edges of the same and arranged to project their beams in parallel relation through the front edges of the stabilizers and beneath the wings, said light-beam-projectors being mounted for turning on horizontal axes considered with relation to the level flight position of the aircraft, said stabilizers having windows in their leading edges through which the light beams pass; and means for stabilizing said light beams while the craft is in flight.

7. In an aircraft having wings and rear horizontal stabilizers: the combination with the stabilizers, of gyroscope-controlled light-beam-projectors located in the stabilizers adjacent the front edges of the same and arranged to project their beams in parallel relation through the front edges of the stabilizers and beneath the wings, said light-beam-projectors being mounted for turning on horizontal axes considered with relation to the level flight position of the aircraft, said stabilizers having windows in their leading edges through which the light beams pass; and means for holding said beams at predetermined angles to the horizontal plane of the aircraft when desired.

8. In an aircraft having wings and horizontal stabilizers located to the rear of the wings; means for projecting parallel light beam projectors from the stabilizers forwardly of the craft in the same plane so as to be visible to the pilot of the craft, and means for automatically blinking the light beam on the high side of the craft when the craft tilts sidewise, for purposes described.

JAMES THOMAS KING.

REFERENCES CITED

The following references are of record in the file of this patent:

UNITED STATES PATENTS

| Number | Name | Date |
| --- | --- | --- |
| 1,349,336 | Haddock | Aug. 10, 1920 |
| 1,356,285 | Hopper | Oct. 19, 1920 |
| 1,958,456 | Warren | May 15, 1934 |
| 2,017,692 | Gaty | Oct. 15, 1935 |
| 2,064,722 | Bartow | Dec. 15, 1936 |
| 2,282,356 | Hellmuth | May 12, 1942 |
| 2,316,751 | Adler | Apr. 20, 1943 |
| 2,365,038 | Adler | Dec. 12, 1944 |

FOREIGN PATENTS

| Number | Country | Date |
| --- | --- | --- |
| 444,326 | Great Britain | Mar. 19, 1936 |
| 510,495 | Great Britain | Aug. 2, 1939 |
| 541,895 | Great Britain | Dec. 16, 1941 |
| 547,412 | Great Britain | Aug. 26, 1942 |